US008439276B2

(12) United States Patent
Prior

(10) Patent No.: US 8,439,276 B2
(45) Date of Patent: May 14, 2013

(54) AERODYNAMIC SHUTTER CONTROL SYSTEMS AND METHODS

(75) Inventor: Gregory P. Prior, Birmingham, MI (US)

(73) Assignee: GM Global Technology Operations LLC

( * ) Notice: Subject to any disclaimer, the term of this patent is extended or adjusted under 35 U.S.C. 154(b) by 717 days.

(21) Appl. No.: 12/712,570

(22) Filed: Feb. 25, 2010

(65) Prior Publication Data

US 2011/0204149 A1  Aug. 25, 2011

(51) Int. Cl.
*F01P 7/10*  (2006.01)
*B60T 8/66*  (2006.01)

(52) U.S. Cl.
USPC .......... 236/35.2; 165/98; 123/41.04; 303/158

(58) Field of Classification Search ................. 236/35.2; 165/98, 99; 123/41.04, 41.05; 303/152
See application file for complete search history.

(56) References Cited

U.S. PATENT DOCUMENTS

| 8,091,668 | B2 * | 1/2012 | Amano et al. ............... 180/68.1 |
| 8,161,919 | B2 * | 4/2012 | Klotz et al. ................. 123/41.04 |
| 8,292,014 | B2 * | 10/2012 | Sugiyama .................... 180/68.1 |
| 8,311,708 | B2 * | 11/2012 | Kerns ............................. 701/49 |
| 2003/0184155 | A1 | 10/2003 | Crombez et al. |
| 2006/0095178 | A1 * | 5/2006 | Guilfoyle et al. ............... 701/36 |

FOREIGN PATENT DOCUMENTS

| DE | 3916907 A1 | 12/1989 |
| DE | 10200706291 | 7/2009 |
| DE | 112008000673 T5 | 1/2010 |
| EP | 15311073 A1 | 5/2005 |

* cited by examiner

*Primary Examiner* — Marc Norman

(57) ABSTRACT

A shutter control system comprises a shutter closing module and a regenerative braking control module. The shutter closing module selectively closes a shutter to decrease aerodynamic drag on the vehicle based on at least one of a brake pedal position, a state of charge of an energy storage device, and a throttle position. The shutter blocks airflow into an engine compartment of the vehicle when closed. The regenerative braking control module controls a motor generator to perform regenerative braking when the shutter is closed.

20 Claims, 7 Drawing Sheets

AERODYNAMIC SHUTTER CONTROL SYSTEMS AND METHODS

FIELD

The present disclosure relates to internal combustion engines and more particularly to aerodynamic shutters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Combustion of an air/fuel mixture within an internal combustion engine generates heat. Cooling the engine is a cyclical process. Cool engine coolant absorbs heat from the engine, and the (warmed) engine coolant is circulated to a radiator. The radiator facilitates heat transfer from the engine coolant to air passing the radiator. The (cooled) engine coolant is circulated from the radiator back to the engine to absorb more heat from and cool the engine.

A cooling fan may also be implemented to provide airflow past the radiator at times when little air may otherwise pass the radiator. For example only, the cooling fan may be activated to provide airflow past the radiator when a vehicle speed is low or when an aerodynamic shutter is open and airflow past the radiator is low.

SUMMARY

A shutter control system comprises a shutter closing module and a regenerative braking control module. The shutter closing module selectively closes a shutter to decrease aerodynamic drag on the vehicle based on at least one of a brake pedal position, a state of charge of an energy storage device, and a throttle position. The shutter blocks airflow into an engine compartment of the vehicle when closed. The regenerative braking control module controls a motor generator to perform regenerative braking when the shutter is closed.

A shutter control method for a vehicle comprises selectively closing a shutter to decrease aerodynamic drag on the vehicle based on at least one of a brake pedal position, a state of charge of an energy storage device, and a throttle position; and controlling a motor generator to perform regenerative braking when the shutter is closed. The shutter blocks airflow into an engine compartment of the vehicle when closed.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
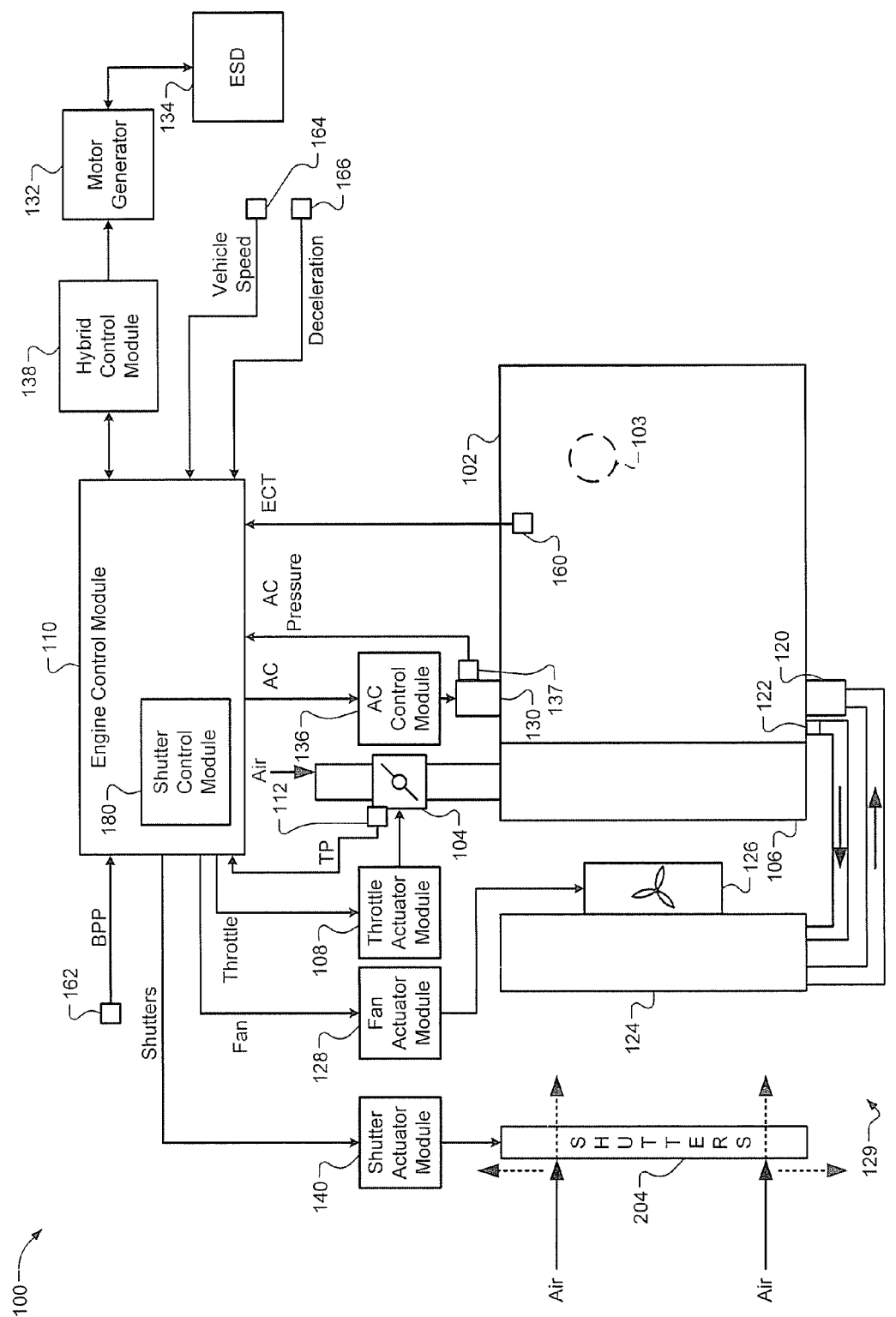
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A vehicle experiences aerodynamic drag while the vehicle is moving. Aerodynamic drag refers to force that opposes motion of an object through a fluid (e.g., air). A vehicle may include an aerodynamic shutter that varies the aerodynamic drag on the vehicle by allowing or blocking airflow into an engine compartment. Blocking airflow into the engine compartment makes the vehicle more aerodynamic. Instead of flowing into the engine compartment and causing aerodynamic drag, blocked air may flow over, under, and/or around the vehicle.

A control module controls whether the aerodynamic shutter is open or closed. For example only, the control module may close the aerodynamic shutter to block airflow into the engine compartment and decrease the aerodynamic drag when a vehicle speed is greater than a predetermined vehicle speed.

The control module may open the aerodynamic shutter when the vehicle speed is greater than the predetermined speed in some circumstances, despite the associated increase in the aerodynamic drag. For example only, the control module may open the aerodynamic shutter during vehicle braking and/or when an engine coolant temperature is greater than a predetermined temperature. The control module may open the aerodynamic shutter during vehicle braking as the associated increase in the aerodynamic drag may help slow the vehicle. The control module may open the aerodynamic shutter when the engine coolant temperature is greater than the predetermined temperature to prevent overheating the engine and/or the engine coolant.

During vehicle braking, the control module of the present disclosure selectively closes the aerodynamic shutter and controls a motor generator to perform regenerative braking. The closing of the aerodynamic shutter decreases the aerodynamic drag on the vehicle, but the regenerative braking applies a braking torque that counteracts the decrease in the aerodynamic drag. In this manner, the energy that would otherwise be lost to aerodynamic drag if the aerodynamic shutter was left open may be converted into electrical energy via regenerative braking. Performing regenerative braking during vehicle braking may also reduce wear on mechanical brakes of the vehicle.

Referring now to FIG. 1, a functional block diagram of an exemplary vehicle system 100 is presented. An engine 102 combusts an air/fuel mixture within one or more cylinders to produce torque for a vehicle. While only cylinder 103 is shown, the engine 102 may include more than one cylinder. Air is drawn into the engine 102 through a throttle valve 104 and an intake manifold 106.

A throttle actuator module 108 controls opening of the throttle valve 104 based on signals from an engine control module (ECM) 110. A throttle position (TP) sensor 112 measures a TP (e.g., opening percentage) and generates a TP signal based on the position. Torque produced by the engine 102 may be output via a crankshaft (not shown).

The combustion of the air/fuel mixture generates heat. A coolant may be used to selectively draw heat away from and cool the engine 102. A coolant pump 120 circulates the coolant. When a thermostat 122 is in a closed state, the coolant pump 120 circulates the coolant through coolant channels (not shown) within the engine 102. When the thermostat 122 is in an open state, coolant within the engine 102 is circulated to a radiator 124, and coolant within the radiator 124 is circulated to the engine 102. The thermostat 122 may open when a temperature of the coolant is greater than a predetermined opening temperature. For example only, the predetermined opening temperature may be approximately 85-95° C.

The radiator 124 facilitates heat transfer from the coolant to air passing the radiator 124. In this manner, the radiator 124 facilitates cooling of the coolant. One or more fans, such as fan 126, may push or draw air across the radiator 124 to increase the airflow passing the radiator 124. For example only, the fan 126 may be activated (i.e. turned ON) to increase the airflow passing the radiator 124 when little air would pass the radiator 124, such as when the vehicle is stopped or at a low vehicle speed.

A fan actuator module 128 may control the fan 126 (e.g., ON or OFF) based on signals from the ECM 110. For example only, the ECM 110 may activate the fan 126 when the coolant temperature is greater than a predetermined fan on temperature. The predetermined fan on temperature may be greater than the predetermined opening temperature and may be, for example, approximately 105° C. In various implementations, the fan 126 may include a variable speed fan.

When more than one fan is implemented, the ECM 110 may activate the fans at different predetermined fan on temperatures. For example only, when two fans are implemented, the ECM 110 may activate one of the fans when the coolant temperature is greater than the predetermined fan on temperature and activate the other of the fans when the coolant temperature is greater than a second predetermined fan on temperature. The second predetermined fan on temperature may be greater than the predetermined fan on temperature and may be, for example, approximately 113° C.

The fan 126 may also be used to increase airflow within an engine compartment 129 in which the engine 102 is located. Increasing the airflow within the engine compartment 129 may cool components other than the engine 102, the engine coolant, and the radiator 124 that are located within the engine compartment 129. For example only, other components that may be implemented within the engine compartment 129 that may be cooled by the fan 126 may include an air conditioning (AC) unit 130, a motor generator 132, an energy storage device (ESD) 134, and other components implemented within the engine compartment 129. While the fan actuator module 128 is shown and described as being controlled by the ECM 110, the fan actuator module 128 may control the fan 126 based on signals from another control module (not shown), such as a chassis control module, a body control module, a hybrid control module, or another suitable module.

An AC control module 136 may control the AC unit 130 based on signals from the ECM 110. A compressor (not shown) of the AC unit 130 selectively compresses a refrigerant, and the compressor may be driven by the crankshaft. The AC unit 130 may provide cooling for a passenger cabin of the vehicle. An AC pressure sensor 137 measures pressure of the refrigerant and generates an AC pressure signal based on the pressure. While the AC control module 136 is shown and described as being controlled by the ECM 110, the AC control module 136 may control the fan AC unit 130 based on signals from another control module (not shown), such as a chassis control module, a body control module, a hybrid control module, or another suitable module.

The motor generator 132 may provide one or more functions for the vehicle. For example only, the motor generator 132 may supplement the torque output of the engine 102 in some circumstances. The motor generator 132 may apply a braking torque to the engine 102 in some circumstances, such as during regenerative braking. Electrical energy generated by the motor generator 132 during regenerative braking may be stored in the ESD 134 and/or may be supplied to one or more vehicle systems for use. In some implementations, the motor generator 132 may also function as a starter of the engine 102 to crank the engine 102 when the engine 102 is not running. In such implementations, the motor generator 132 may be referred to as a belt alternator starter (BAS). While only the motor generator 132 is shown, the vehicle may include more than one motor generator 132 and more than one motor generator or other electric motor may be included. A hybrid control module 138 may control the motor generator 132 based on signals from the ECM 110.

Figure 2A:
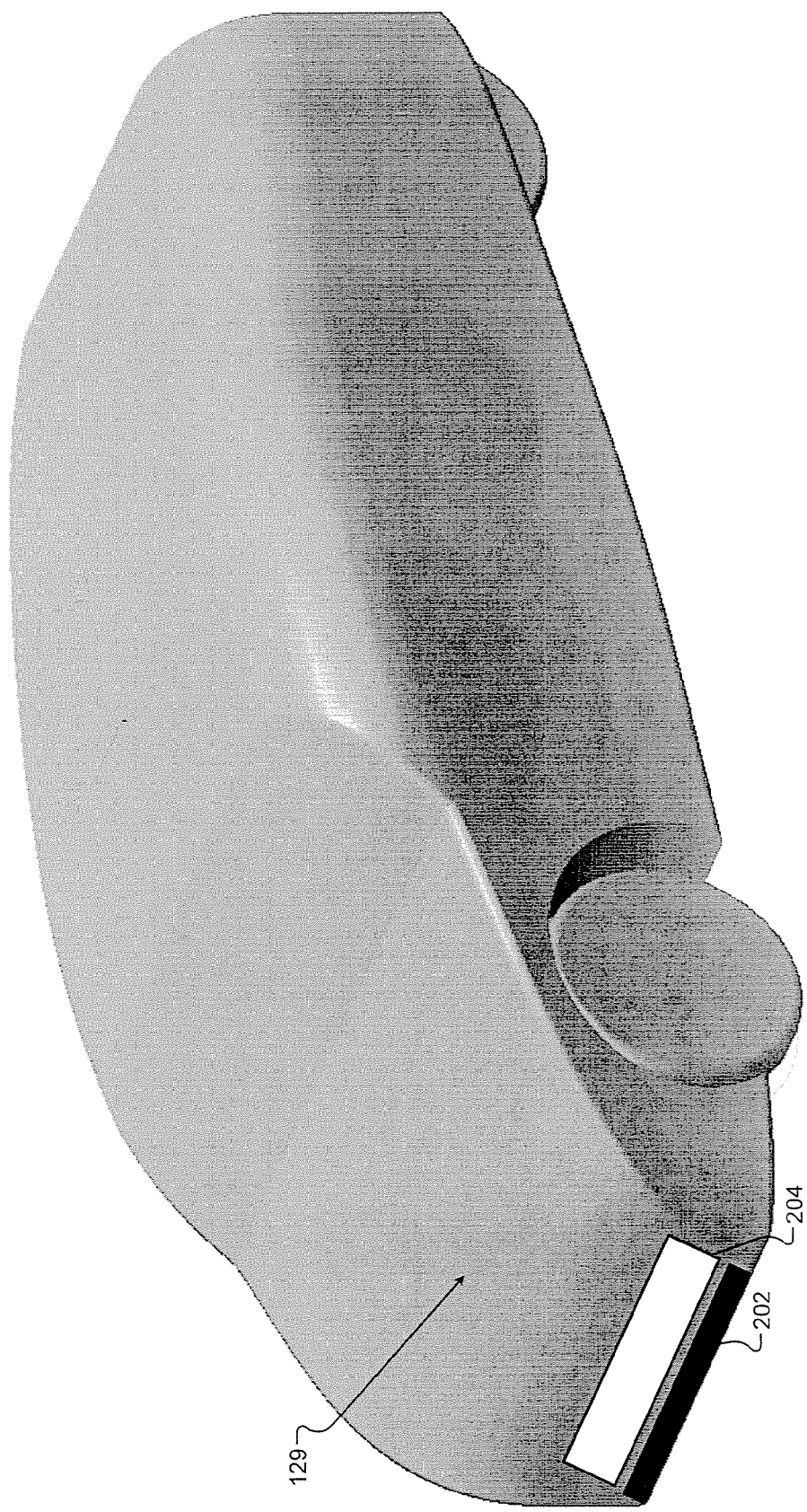
FIGS. 2A and 2B are diagrams of an exemplary vehicle having open and closed aerodynamic shutters, respectively, according to the principles of the present disclosure.
Figure 2B:
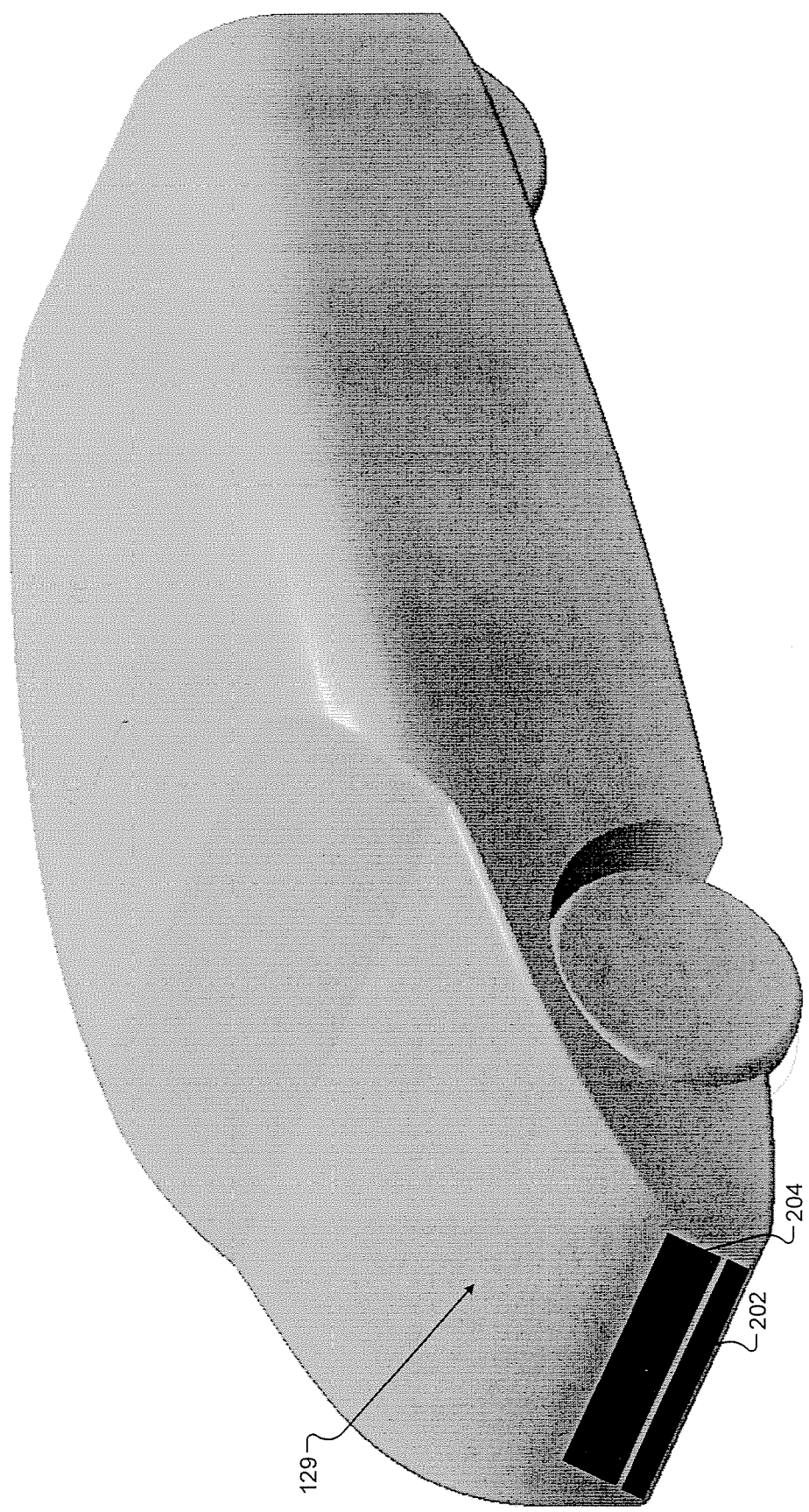

Referring now to FIGS. 2A-2B, air may flow into the engine compartment 129 through a grille 202. When shutters 204 are in an open state, air may also flow into the engine compartment 129 through the shutters 204. When in a closed state, the shutters 204 block airflow into the engine compartment 129. Instead of flowing into the engine compartment 129, air blocked by the shutters 204 may be directed over, around, and/or under the vehicle.

Aerodynamic drag refers to force imposed by a fluid (e.g., air) that opposes the motion of the vehicle in the forward direction while the vehicle travels through the fluid. The open/closed state of the shutters 204 affects the aerodynamic drag experienced. More specifically, the aerodynamic drag may be lower when the shutters 204 are closed than when the shutters 204 are open. FIG. 2A is an exemplary illustration of when the shutters 204 are closed. FIG. 2B is an exemplary illustration of when the shutters 204 are open.

Figure 3:
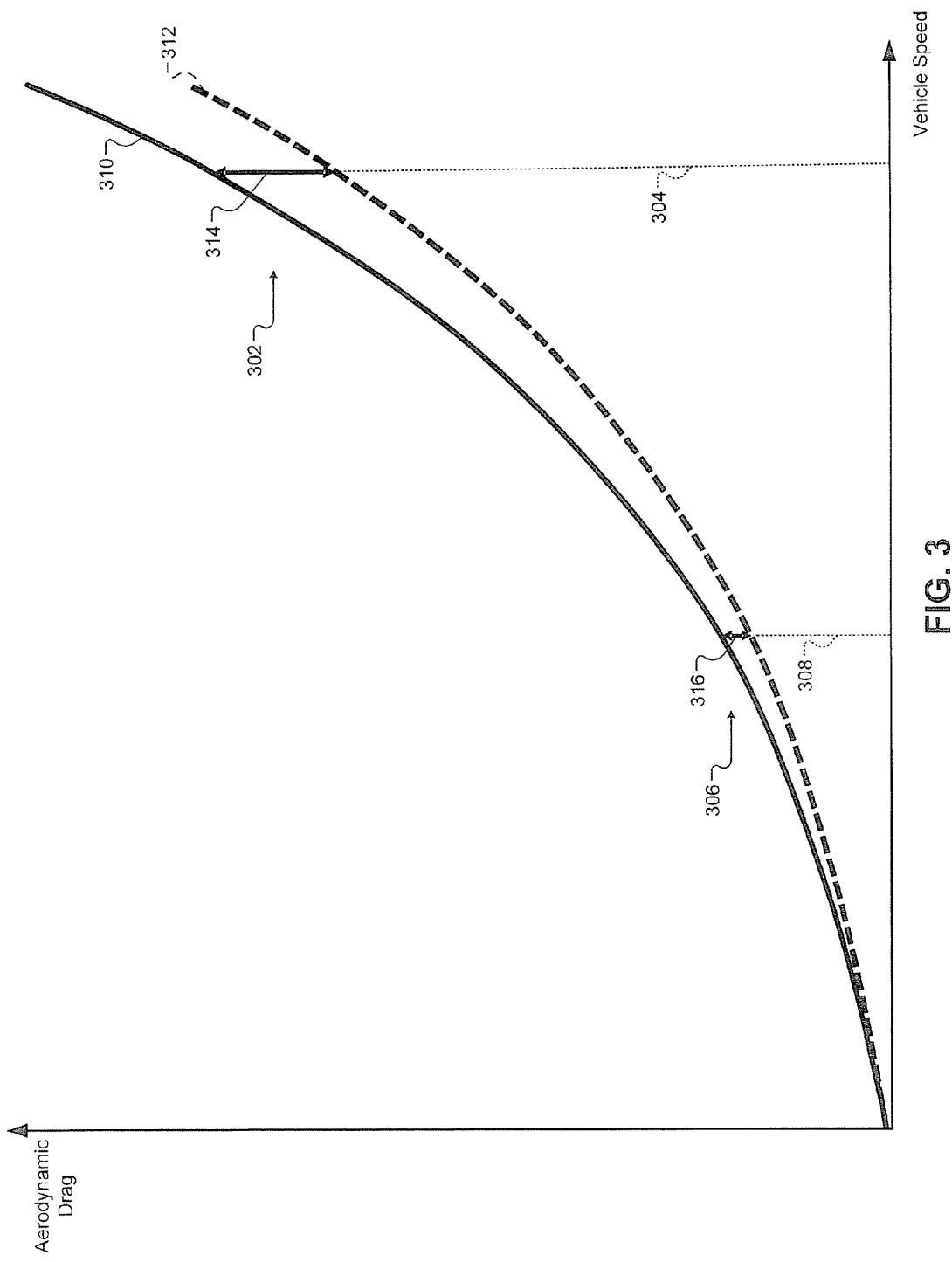
FIG. 3 is an exemplary graph of aerodynamic drag versus vehicle speed according to the principles of the present disclosure.

Referring now to FIG. 3, a graph of the relationship between vehicle speed and aerodynamic drag of a vehicle is presented. Generally, the aerodynamic drag increases as vehicle speed increases. For example only, a first aerodynamic drag 302 may be experienced at a first vehicle speed 304 and a second aerodynamic drag 306 may be experienced at a second vehicle speed 308. For example only, the aerodynamic drag may be based on vehicle speed squared. While the relationship between vehicle speed and aerodynamic drag may be exponential as depicted in the exemplary embodiment of FIG. 3, the relationship between aerodynamic drag and vehicle speed may take other forms.

Opening of the shutters 204 increases the aerodynamic drag. Exemplary trace 310 tracks the aerodynamic drag when the shutters 204 are open. Exemplary dashed trace 312 tracks the aerodynamic drag when the shutters 204 are closed. As shown, the aerodynamic drag at a given vehicle speed when the shutters 204 are open is greater than when the aerodynamic drag at the given vehicle speed when the shutters 204 are closed. As the vehicle speed increases, the magnitude of the increase in the aerodynamic drag attributable to the shutters 204 being open also increases. This is illustrated by exemplary arrows 314 and 316.

During vehicle braking, regenerative braking may be performed. Performing regenerative braking may enable conversion of the energy that would otherwise be lost to aerodynamic drag into electrical energy. Performing regenerative braking may also reduce or eliminate the amount of braking performed by mechanical brakes. When the shutters 204 are open during vehicle braking, the shutters 204 may selectively be closed. The amount of regenerative braking performed may be increased to offset the decrease in the aerodynamic drag attributable to the closing of the shutters 204.

When the vehicle is undergoing a rapid deceleration when the shutters 204 are closed, the shutters 204 may selectively be opened. Opening the shutters 204 during rapid deceleration increases the aerodynamic drag. Accordingly, opening the shutters 204 may decrease a stopping distance of the vehicle.

Referring again to FIG. 1, a shutter actuator module 140 may control opening and closing of the shutters 204 based on signals from the ECM 110. The opening and closing of the shutters 204 may be controlled electrically, by vacuum, mechanically, electro-mechanically, or in another suitable manner.

The ECM 110 may make various control decisions based on signals from one or more sensors. An engine coolant temperature (ECT) sensor 160 measures the temperature of the coolant and generates an ECT signal based on the coolant temperature. While the ECT sensor 160 is shown as being located within the engine 102, the ECT sensor 160 may be located in another suitable location where the coolant is circulated, such as within the radiator 124.

A brake pedal position (BPP) sensor 162 measures a position of a brake pedal and generates a BPP signal accordingly. A vehicle speed sensor 164 measures the vehicle speed and generates a vehicle speed signal based on the vehicle speed. For example only, the vehicle speed sensor 164 may measure the vehicle speed based on a wheel speed, a transmission output speed, a transmission input speed, an engine speed, or another suitable measure of vehicle speed. A deceleration sensor 166 measures a deceleration of the vehicle with respect to a forward direction of the vehicle and generates a deceleration signal based on the deceleration.

The ECM 110 may include a shutter control module 180. While the shutter control module 180 is shown and described as being controlled by the ECM 110, the shutter control module 180 may implemented in another control module or independently. For example only, the shutter control module 180 may be implemented in a chassis control module, a body control module, a hybrid control module, or another suitable module.

When the shutters 204 are open during vehicle braking, the shutter control module 180 selectively closes the shutters 204 and initiates performance of regenerative braking. The amount of regenerative braking performed may be based on the decrease in aerodynamic drag associated with the closing of the shutters 204. When the shutters 204 are closed during a rapid deceleration, the shutter control module 180 selectively opens the shutters 204 to increase the aerodynamic drag and slow the vehicle at a faster rate.

Figure 4:
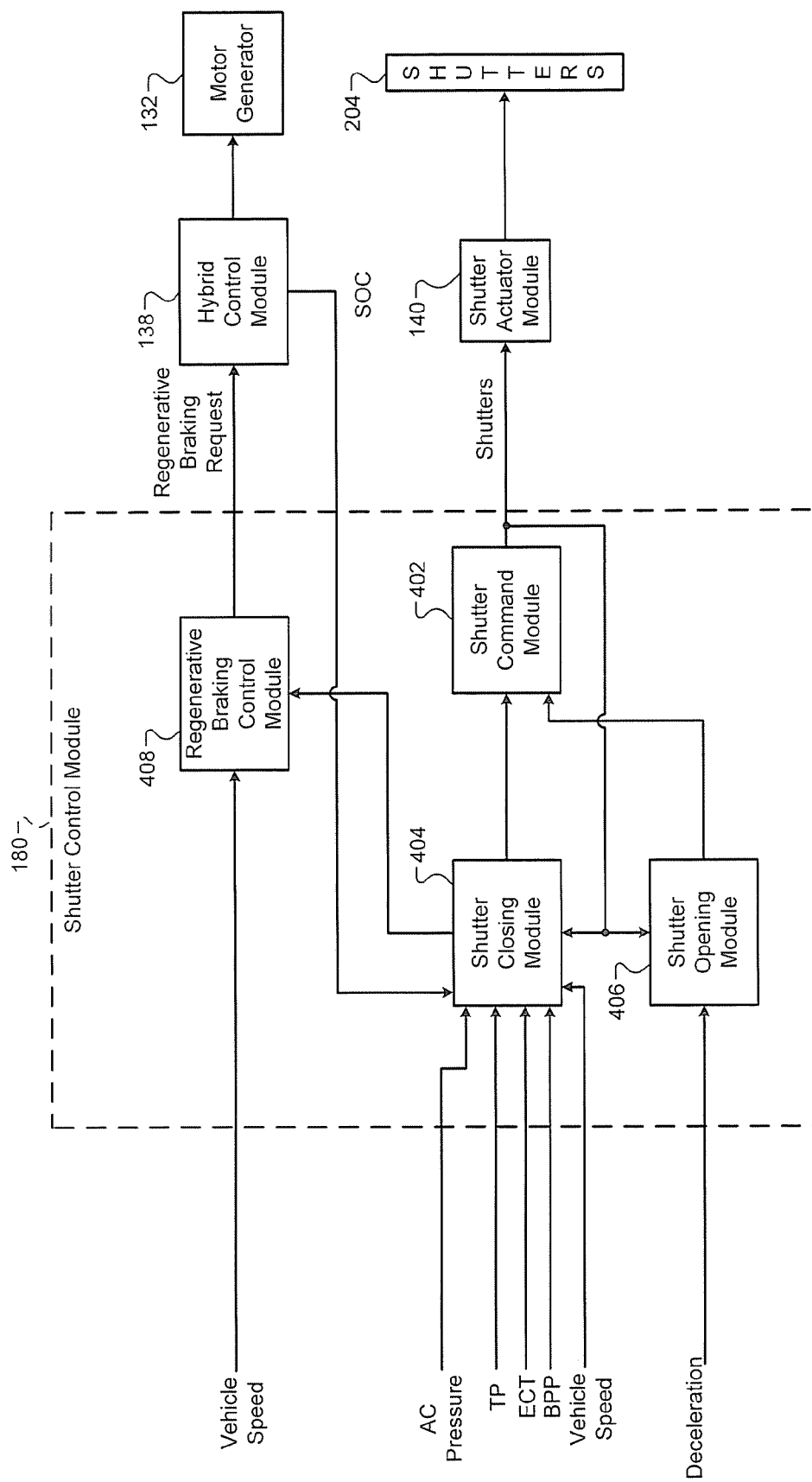
FIG. 4 is a functional block diagram of an exemplary implementation of a shutter control module according to the principles of the present disclosure.

Referring now to FIG. 4, a functional block diagram of an exemplary implementation of the shutter control module 180 is presented. The shutter control module 180 may include a shutter command module 402, a shutter closing module 404, and a shutter opening module 406. The shutter control module 180 may also include a regenerative braking control module 408.

The shutter command module 402 selectively generates commands for controlling the opening and closing of the shutters 204. The shutter command module 402 may output the commands to the shutter actuator module 140. The shutter actuator module 140 controls the shutters 204 based on the commands. The shutter command module 402 may generate the commands based on requests from, for example, the shutter closing module 404, and the shutter opening module 406.

When the shutters 204 are open, the shutter closing module 404 selectively requests closing of the shutters 204 during vehicle braking. The shutter closing module 404 may determine whether the shutters 204 are open based on the commands from the shutter command module 402 and/or another suitable indicator of whether the shutters 204 are open or closed.

The shutter closing module 404 selectively requests closing of the shutters 204 to decrease the aerodynamic drag during vehicle braking. The braking torque applied by the motor generator 132 in performing regenerative braking may offset the decrease in the aerodynamic drag.

The shutter closing module 404 may selectively request closing of the shutters 204 based on at least one of a state of charge (SOC) of the ESD 134, the BPP, the vehicle speed, the AC pressure, the TP, and the ECT. For example only, when the shutters 204 are open, the shutter closing module 404 may request closing of the shutters 204 when the BPP is greater than a predetermined brake pedal position, the SOC is less than a predetermined SOC, and the TP is less than a predetermined TP. Before requesting the closing of the shutters 204, the shutter closing module 404 may also verify that the ECT is less than a predetermined temperature, the AC pressure is less than a predetermined pressure, and the vehicle speed is greater than a predetermined speed.

The hybrid control module 138 may estimate the SOC of the ESD 134 and provide the SOC to the shutter closing module 404. The predetermined SOC may be near a maximum SOC of the ESD 134 and may be, for example, approximately 90%. In this manner, the shutter closing module 404 may avoid requesting closing of the shutters 204 for regenerative braking when the ESD 134 may be able to store little or no energy. The predetermined BPP may be, for example, approximately 1%. In this manner, the request for closing of the shutters and performance of regenerative braking is performed when the driver has requested vehicle braking.

The predetermined temperature may be less than the predetermined fan on pressure, for example, approximately 105° C. In this manner, the shutters 204 are not closed when airflow into the engine compartment 129 may help cool the engine coolant, the engine 102, and/or components within the engine compartment 129. The predetermined pressure may be, for example, approximately 1200 kPa. In this manner, the shutters 204 are not closed when the airflow into the engine compartment 129 may help cool the AC unit 130. In various implementations, the shutter closing module 402 may determine that the AC pressure is less than the predetermined pressure when the AC compressor is disengaged from the engine 102 and not compressing refrigerant.

The predetermined speed may be, for example, approximately 25-30 miles per hour. At vehicle speeds below the predetermined speed, the decrease in the aerodynamic drag achieved by closing the shutters 204 may be small or negligible and, thus, little regenerative braking may be performed. The predetermined TP may be near a minimum TP, such as approximately 2-3% greater than the minimum TP. In this manner, the shutters 204 will not be closed when the engine 102 is producing heat and torque pursuant to a driver's request (as would be indicated by the TP being greater than the predetermined TP). The shutter command module 402 commands closing of the shutters 204 when the shutter closing module 404 generates the request.

The shutter closing module 404 may generate a regenerative braking indicator along with the request for closing of the shutters 204. The regenerative braking control module 408 may generate a regenerative braking request when the regenerative braking indicator is generated. The regenerative braking control module 408 may provide the regenerative braking request to the hybrid control module 138, and the hybrid control module 138 may control the motor generator 132 to perform regenerative braking based on the regenerative braking request. When the regenerative braking indicator is generated, the regenerative braking control module 408 may increase the regenerative braking request. Performance of regenerative braking may be delayed for a predetermined delay period after the request for closing of the shutters 204 is generated. Delaying regenerative braking until the predetermined delay period has passed may ensure that the shutters 204 are closed before regenerative braking is performed.

The regenerative braking control module 408 may set the regenerative braking request based on the decrease in the aerodynamic drag attributable to the closing of the shutters 204. For example only, the regenerative braking control module 408 may estimate the decrease in the aerodynamic drag based on the vehicle speed and set the regenerative braking request based on the estimated decrease. In this manner, the decrease in the aerodynamic drag achieved with the shutters 204 closed may be offset by the braking torque applied by the motor generator 132 during regenerative braking.

When the shutters 204 are closed, the shutter opening module 406 may selectively request opening of the shutters 204. The shutter opening module 406 may selectively request opening of the shutters 204 based on the deceleration. More specifically, the shutter opening module 406 may request opening of the shutters 204 when the deceleration is greater than a predetermined deceleration.

In various implementations, whether an antilock braking system (ABS) is controlling vehicle braking may be used as an indicator of whether the deceleration is greater than the predetermined deceleration. For example only, the deceleration may be deemed greater than the predetermined deceleration when the ABS is controlling vehicle braking.

Opening the shutters 204 increases the aerodynamic drag and, thus, the vehicle may decelerate at a faster rate. Deceleration faster than the predetermined deceleration may indicate that the driver wishes to stop the vehicle as fast as possible. By opening the shutters 204 and increasing the aerodynamic drag, the vehicle may achieve a shorter stopping distance. The stopping distance may refer to a distance between a current location and a location where the vehicle comes to a stop (e.g., vehicle speed=0). The shutter command module 402 commands the shutter actuator module 140 to open the shutters 204 when the shutter opening module 406 generates the request.

A request to open the shutters 204 generated by the shutter opening module 406 may be given a higher priority than a request to close the shutters 204 generated by the shutter closing module 404. In other words, a request to open the shutters from the shutter opening module 406 may override a request to close the shutters 204 from the shutter closing module 404. Accordingly, the shutter command module 402 may open the shutters 204 when the shutter opening module 406 generates a request even when the shutter closing module 404 has requested that the shutters 204 be closed.

Figure 5:
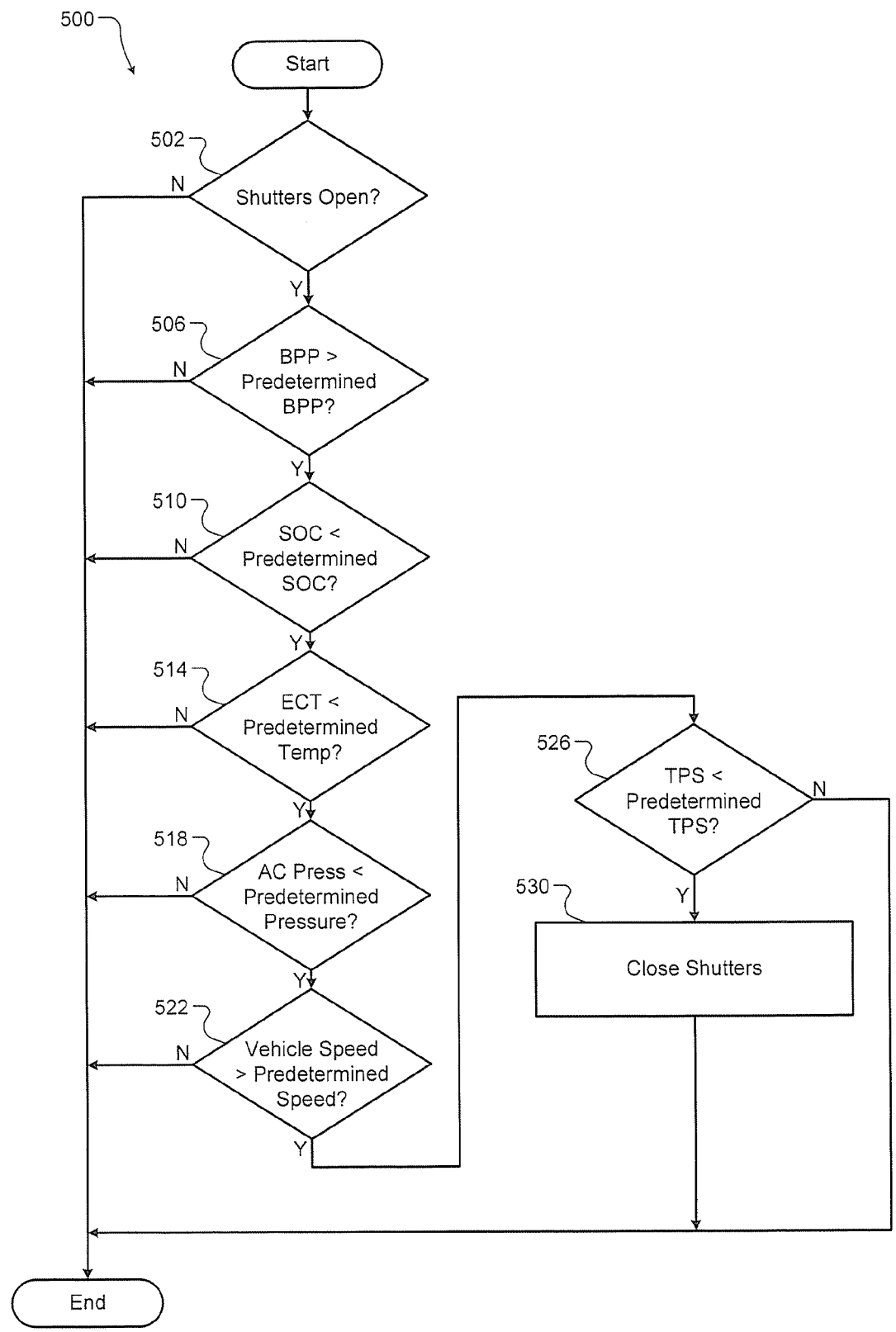
FIG. 5 is a flowchart depicting an exemplary method of controlling closing aerodynamic shutters according to the principles of the present disclosure.

Referring now to FIG. 5, a flowchart depicting an exemplary method 500 is presented. Control may begin with 502 where control determines whether the shutters 204 are open. If true, control may continue with 506; if false, control may end. At 506, control may determine whether the BPP is greater than the predetermined BPP. If true, control may continue with 510; if false, control may end.

At 510, control may determine whether the SOC of the ESD 134 is less than the predetermined SOC. If true, control may continue with 514; if false, control may end. Control may determine whether the ECT is greater than the predetermined temperature at 514. If true, control may continue with 518; if false, control may end. At 518, control may determine whether the AC pressure is less than the predetermined pressure. If true, control may continue with 522; if false, control may end.

Control may determine whether the vehicle speed is greater than the predetermined speed in step 522. If true, control may continue with 526; if false, control may end. At 526, control may determine whether the TP is less than the predetermined TP. If true, control may close the shutters 204 at 530; if false, control may end. When the shutters 204 are closed, control may increase the amount of regenerative braking performed by the motor generator 132.

Figure 6:
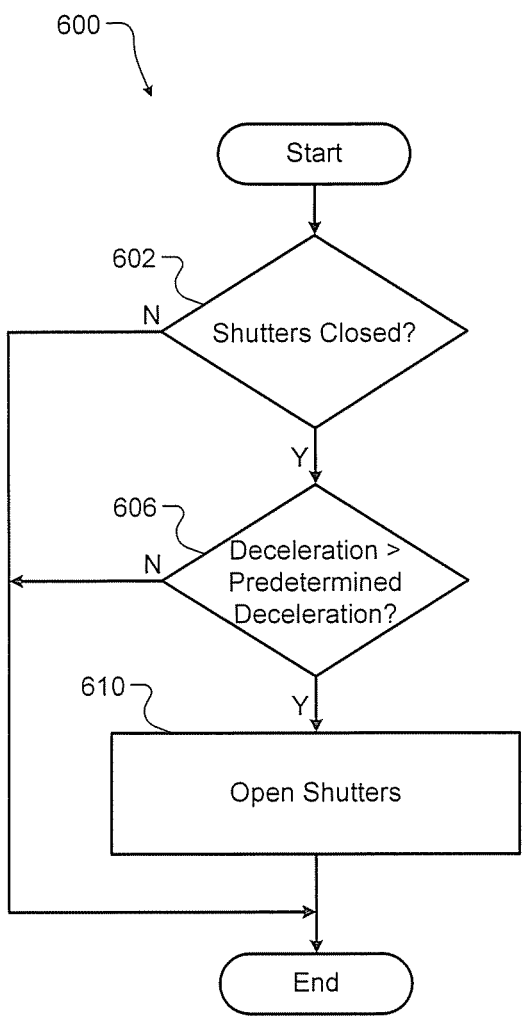
FIG. 6 is a flowchart depicting an exemplary method of controlling opening of aerodynamic shutters according to the principles of the present disclosure.

Referring now to FIG. 6, a flowchart depicting an exemplary method 600 is presented. Control may begin with 602 where control determines whether the shutters 204 are closed. If true, control may continue with 606; if false, control may end. Control may determine whether the deceleration is greater than the predetermined deceleration at 606. If true, control may open the shutters 204 at 510 and end; if false, control may end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A shutter control system for a vehicle, comprising:
   a shutter closing module that selectively closes a shutter to decrease aerodynamic drag on the vehicle based on at least one of a brake pedal position, a state of charge of an energy storage device, and a throttle position,
   wherein the shutter blocks airflow into an engine compartment of the vehicle when closed; and
   a regenerative braking control module that controls a motor generator to perform regenerative braking when the shutter is closed.

2. The shutter control system of claim 1 wherein the shutter closing module selectively closes the shutter when the brake pedal position is greater than a predetermined brake pedal position, the state of charge is less than a predetermined state of charge, and the throttle position is less than a predetermined throttle position.

3. The shutter control system of claim 2 wherein the shutter closing module selectively closes the shutter further based on a vehicle speed.

4. The shutter control system of claim 3 wherein the shutter closing module selectively closes the shutter when the vehicle speed is greater than a predetermined speed.

5. The shutter control system of claim 2 wherein the shutter closing module selectively closes the shutter further based on an engine coolant temperature.

6. The shutter control system of claim 5 wherein the shutter closing module selectively closes the shutter when the engine coolant temperature is less than a predetermined temperature.

7. The shutter control system of claim 2 wherein the shutter closing module selectively closes the shutter further based on an air conditioning compressor pressure.

8. The shutter control system of claim 2 wherein the shutter closing module closes the shutter further based on an engine coolant temperature, an air conditioning compressor pressure, and a vehicle speed, and
wherein the shutter closing module closes the shutter when the engine coolant temperature is less than a predetermined temperature, the air conditioning compressor pressure is less than a predetermined pressure, and the vehicle speed is greater than a predetermined speed.

9. The shutter control system of claim 1 further comprising a shutter opening module that, when the shutter is closed, selectively opens the shutter and increases the aerodynamic drag on the vehicle based on a deceleration of the vehicle.

10. The shutter control system of claim 9 wherein the shutter opening module opens the shutter when the deceleration is greater than a predetermined deceleration.

11. A shutter control method for a vehicle, comprising:
selectively closing a shutter to decrease aerodynamic drag on the vehicle based on at least one of a brake pedal position, a state of charge of an energy storage device, and a throttle position,
wherein the shutter blocks airflow into an engine compartment of the vehicle when closed; and
controlling a motor generator to perform regenerative braking when the shutter is closed.

12. The shutter control method of claim 11 further comprising selectively closing the shutter when the brake pedal position is greater than a predetermined brake pedal position, the state of charge is less than a predetermined state of charge, and the throttle position is less than a predetermined throttle position.

13. The shutter control method of claim 12 further comprising selectively closing the shutter further based on a vehicle speed.

14. The shutter control method of claim 13 further comprising selectively closing the shutter when the vehicle speed is greater than a predetermined speed.

15. The shutter control method of claim 12 further comprising selectively closing the shutter further based on an engine coolant temperature.

16. The shutter control method of claim 15 further comprising selectively closing the shutter when the engine coolant temperature is less than a predetermined temperature.

17. The shutter control method of claim 12 further comprising selectively closing the shutter further based on an air conditioning compressor pressure.

18. The shutter control method of claim 12 further comprising:
selectively closing the shutter further based on an engine coolant temperature, an air conditioning compressor pressure, and a vehicle speed; and
closing the shutter when the engine coolant temperature is less than a predetermined temperature, the air conditioning compressor pressure is less than a predetermined pressure, and the vehicle speed is greater than a predetermined speed.

19. The shutter control method of claim 11 further comprising, when the shutter is closed, selectively opening the shutter and increasing the aerodynamic drag on the vehicle based on a deceleration of the vehicle.

20. The shutter control method of claim 19 further comprising opening the shutter when the deceleration is greater than a predetermined deceleration.

* * * * *